Jan. 30, 1951 R. P. RAMSEY 2,539,471
LOCOMOTIVE DRIVE
Filed June 19, 1946 6 Sheets-Sheet 1
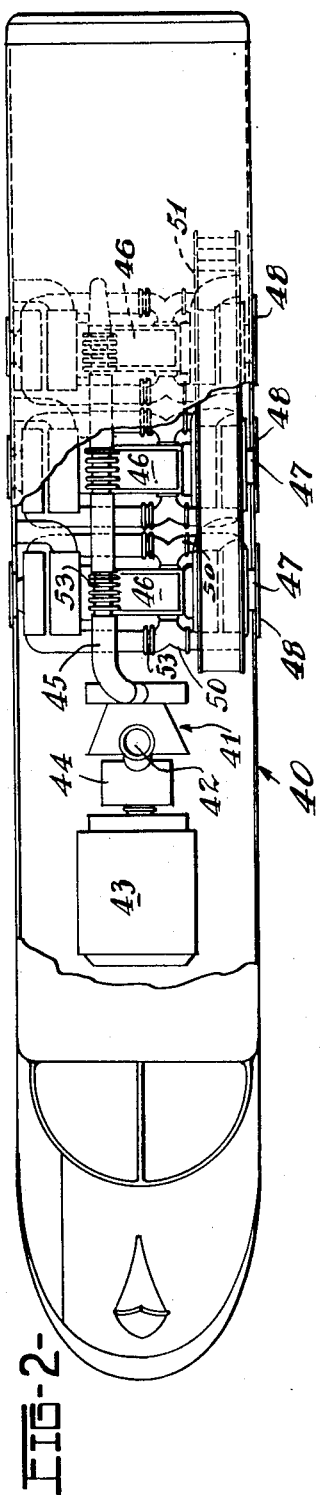
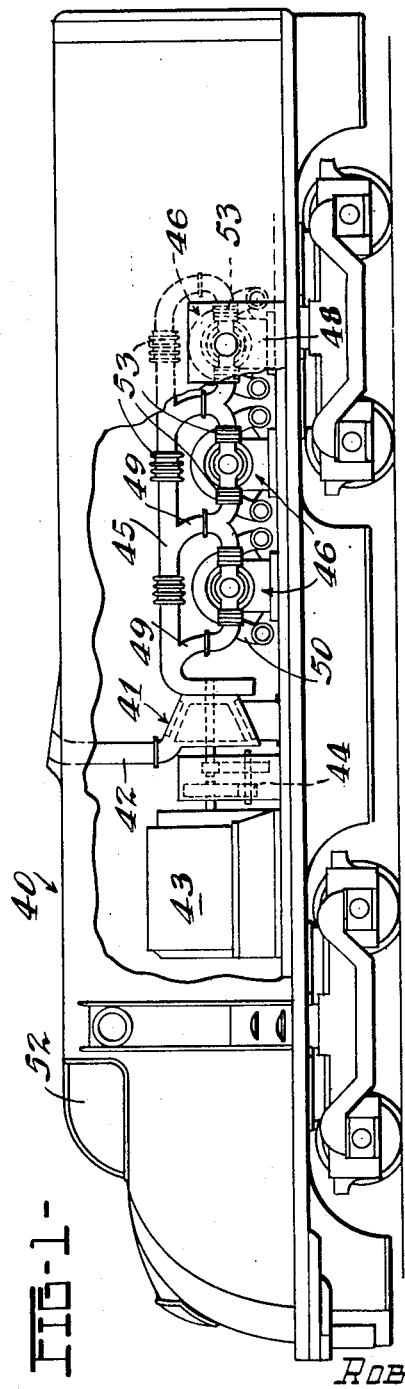
Inventor
ROBERT P. RAMSEY
By
Owen & Owen
Attorneys

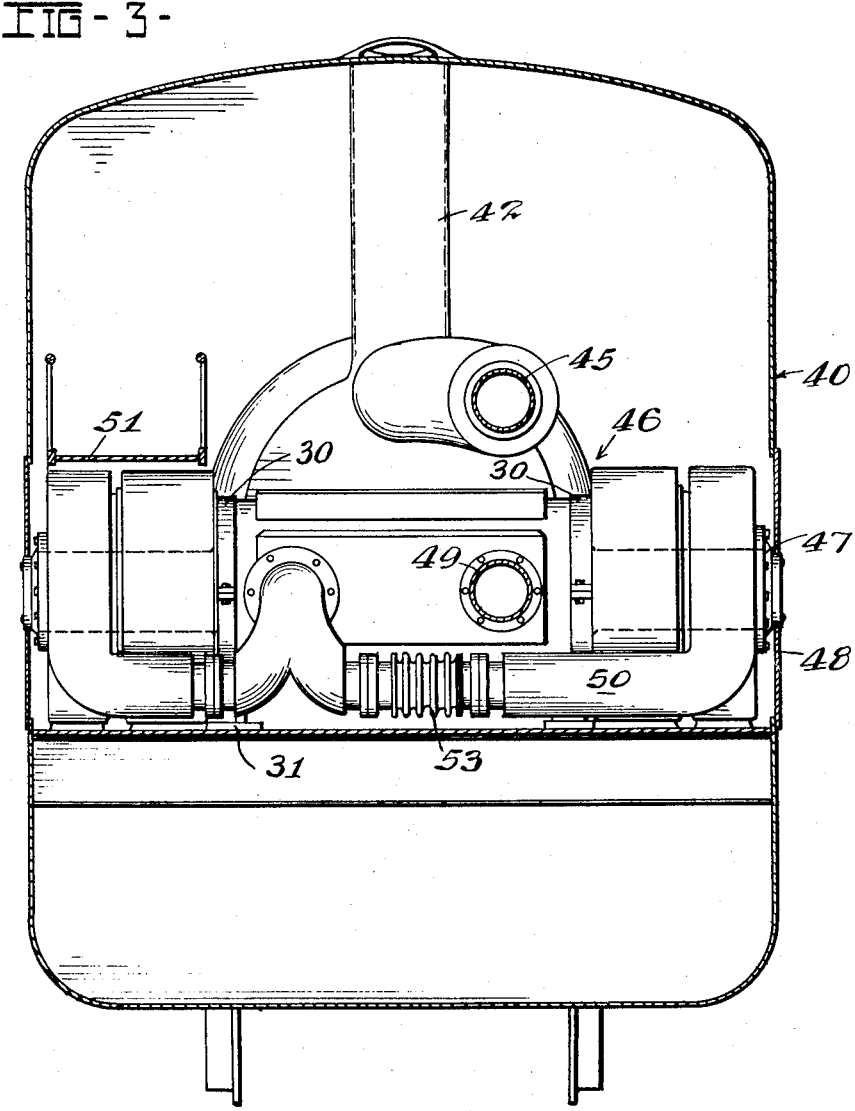

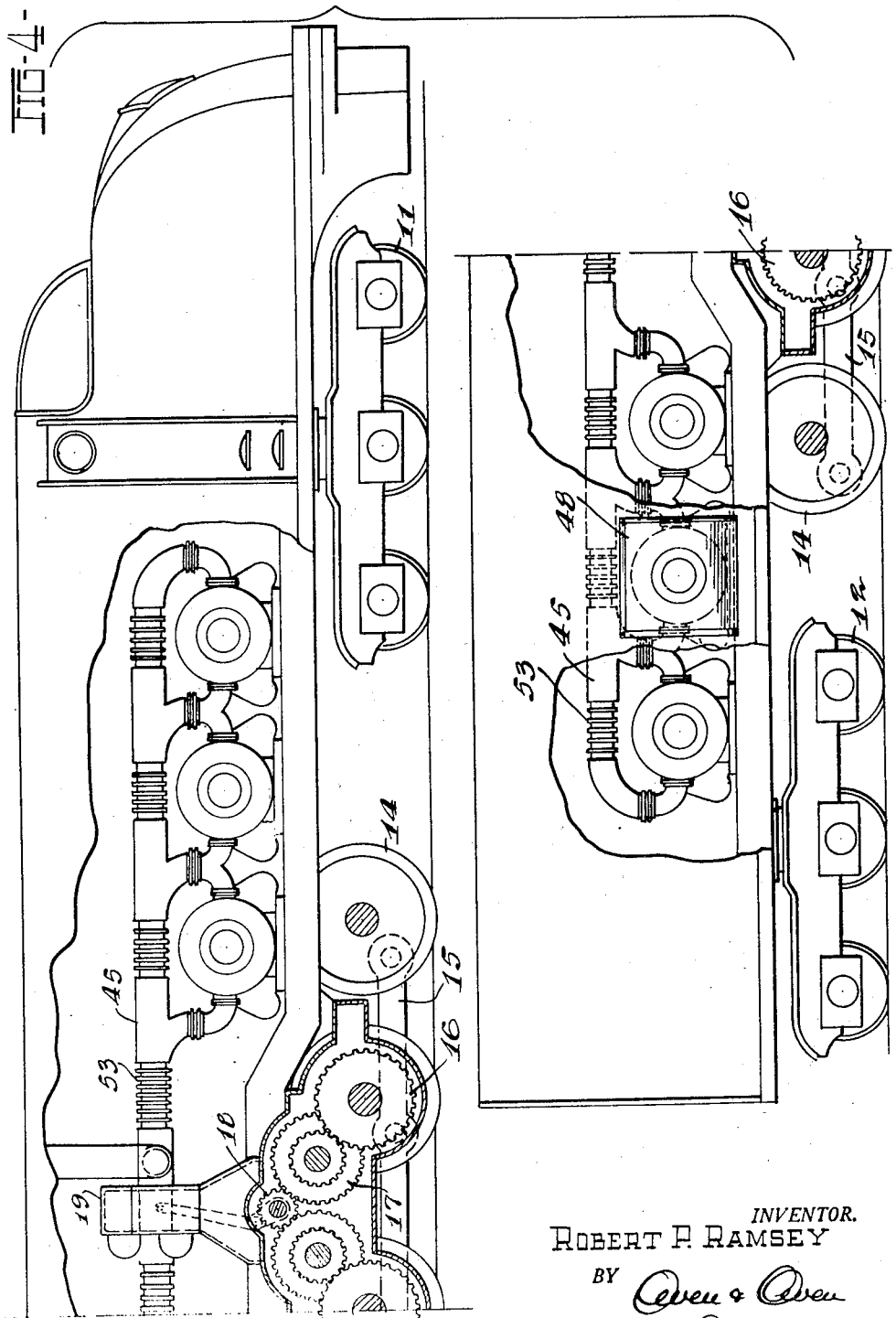

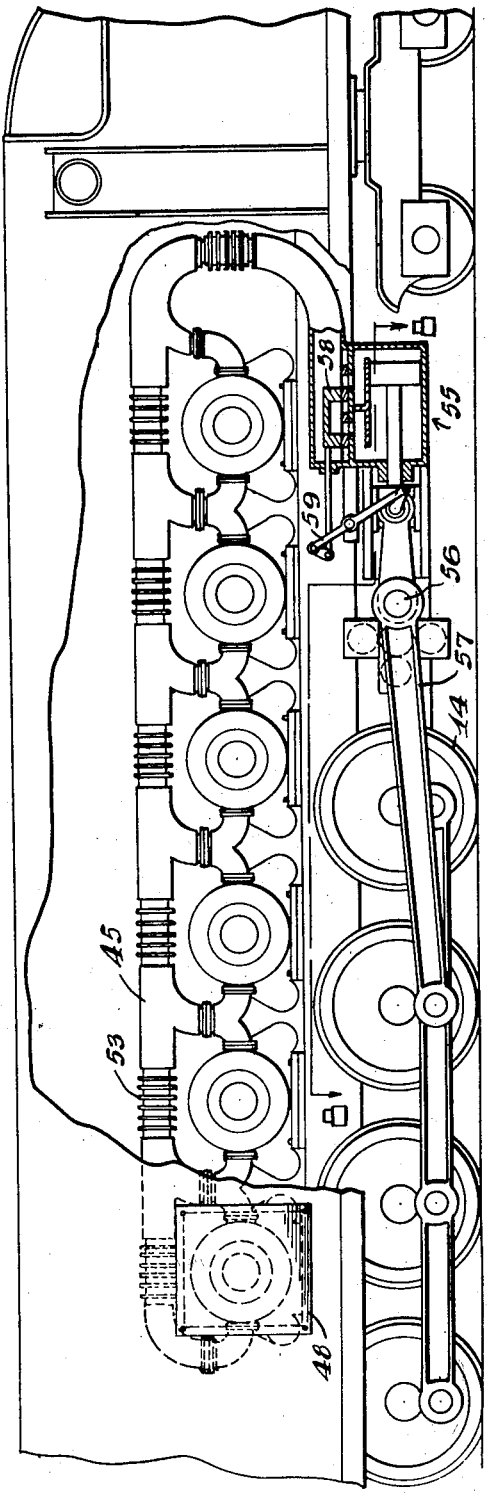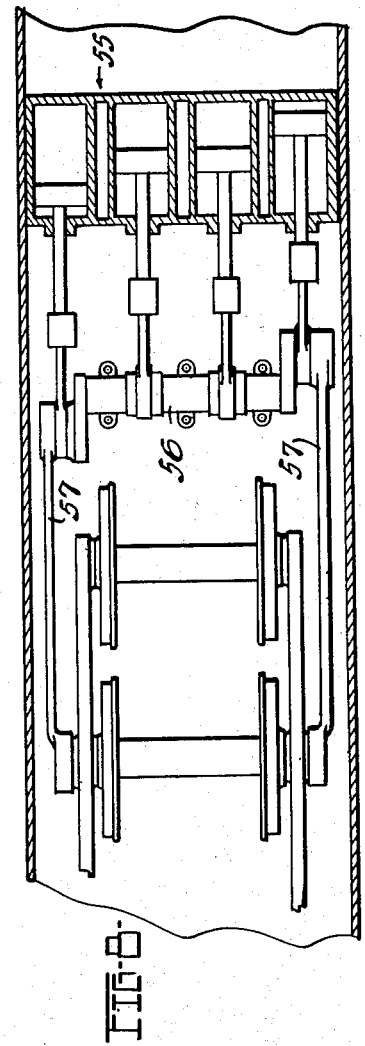
INVENTOR.
ROBERT P. RAMSEY

Jan. 30, 1951   R. P. RAMSEY   2,539,471
LOCOMOTIVE DRIVE
Filed June 19, 1946   6 Sheets-Sheet 5
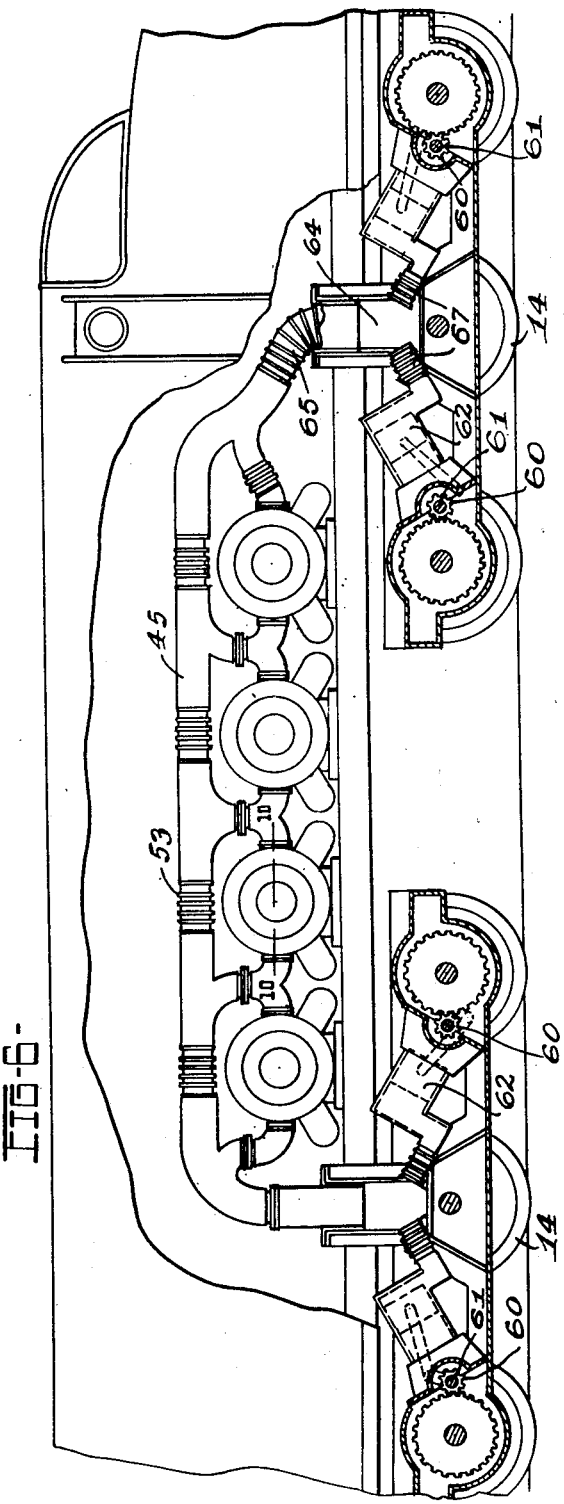
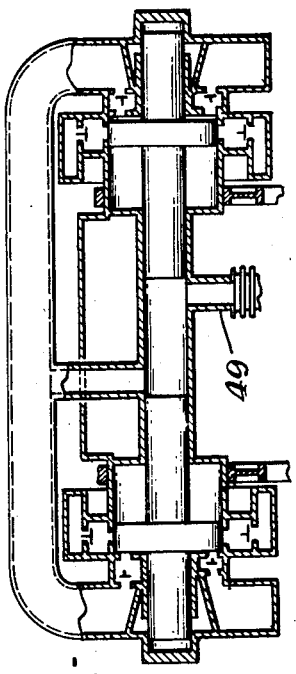
INVENTOR.
ROBERT P. RAMSEY
BY
ATTORNEYS

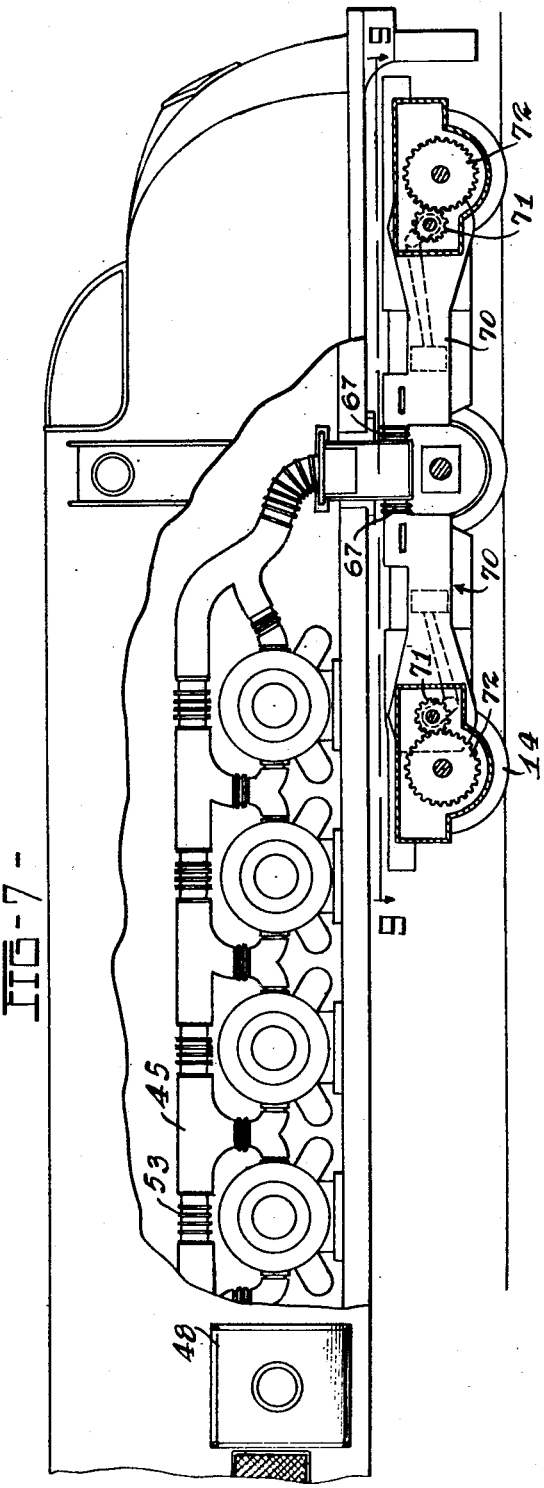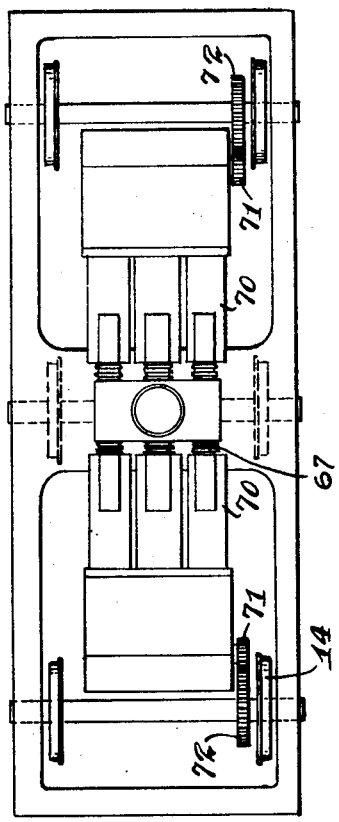

Patented Jan. 30, 1951

2,539,471

UNITED STATES PATENT OFFICE 2,539,471

LOCOMOTIVE DRIVE

Robert P. Ramsey, Hamilton, Ohio, assignor to Lima-Hamilton Corporation, Hamilton, Ohio, a corporation of Virginia Application June 19, 1946, Serial No. 677,856

4 Claims. (Cl. 105—62)

This application is a continuation-in-part of my co-pending application, Serial Number 590,489, filed April 26, 1945.

This invention relates to a power unit for a locomotive of the type in which power gas generators supply hot compressed gas to a locomotive prime mover.

More particularly the invention relates to a power unit wherein the locomotive is driven either by reciprocating engines or by a turbo-electric drive, the reciprocating engines and turbine being supplied by a plurality of power gas generators. The invention is particularly directed to an advantageous arrangement of the gas generators with respect to the locomotive floor and to each other.

An object of the invention is to provide a power unit of the type described which is very compact.

Another object is to provide a mounting of the gas generating units which will serve to minimize difficulties encountered from thermal expansion.

Another object of the invention is to provide a unit wherein several interchangeable gas generators may be employed with a single turbine or reciprocating engine and each of the power gas generators may be removed independently of the others for repair or replacement.

Still another object of the invention is to provide a power unit of the type described which will impart a minimum of vibration to its support.

Still another object of the invention is to provide a power unit of the type described which can be located with respect to the locomotive floor in such a manner that the center of gravity of the entire assembly is very low so that the locomotive is inherently very stable with respect to its tracks.

Other objects and advantages will become apparent from the following specification, reference being had to the accompanying drawings in which:

Fig. 1 is a side elevation, with parts broken away, of a locomotive embodying the present invention; Fig. 2 is a top plan view with parts broken away, of the locomotive shown in Fig. 1; Fig. 3 is a central vertical sectional view taken on line 3—3 of Fig. 1; Fig. 4 is a diagrammatic side elevation with parts broken away of a locomotive having a reciprocating engine drive; Figs. 5, 6, and 7 are views showing several modifications of reciprocating engine drives; Fig. 8 is a diagrammatic section on line 8—8 of Fig. 5; Fig. 9 is a diagrammatic section on line 9—9 of Fig. 7; and Fig. 10 is a diagrammatic view, partly in section on line 10—10 of Fig. 6, of a suitable free piston power gas generator.

It has heretofore been proposed to drive locomotives by using compressed air instead of the usual steam, either in a turbine or in one or more reciprocating engines. While it has certain advantages, the cycle characterized by the use of compressed air presents certain difficulties and is of relatively low thermal efficiency. The present invention provides a cycle of greatly increased thermal efficiency. By the present invention it becomes possible to mount on the floor of a single railway locomotive car, apparatus which is sufficiently powerful to move an entire train so that it is no longer necessary to couple together several power cars as is common in Diesel locomotive practice.

Another advantage of the present invention is that it is applicable to electric locomotive installations since the power gas turbine can be utilized to drive an electric generator of sufficient capacity to supply power to the electric motors of standard electric locomotives. Thus the locomotive according to the present invention, may be operated in a train with a standard electric locomotive over a track area which is not electrified. In such an installation the electric locomotive operates normally over an electrified track area taking power from its usual overhead lines, but instead of being uncoupled and replaced at the end of the electrified track area continues to pull the train with power taken from the electric generators operated by the power gas turbine.

In the arrangement of the invention indicated in Figs. 1, 2, and 3 there is shown a power unit mounted upon a railway locomotive 40. In the unit shown, there is a turbine 41 provided with an exhaust 42 and driving an electric generator 43 through a reduction gear 44. The power gas to the turbine is supplied through a manifold 45 from a series of power gas generators 46. The gas generators are of the balanced free piston internal combustion type, shown in section in Fig. 10. The gas generator need not be described in detail in this application.

In the arrangement shown, the gas generators are arranged transversely with respect to the axis of the car and removable cylinder heads 47 at their ends are substantially flush with the car sides and are accessible and removable through openings therein. These openings are partially closed, in the present instance, by cover plates 48 which can be removed to provide more complete access to the power gas generators and which are of sufficient size so that the generators can be completely removed therethrough.

Each power gas generator 46 has an exhaust connection 49 to supply heated gas under pressure to the manifold 45. The scavenging receiver 50 for each generator 46 distributes the compressed air from the compressor chamber to the combustion chamber of the generator. The fuel pump and control adjustments (not shown) are placed on the top of the unit so as to be readily accessible from a catwalk 51. Controls from the various units may be taken to a cab 52 in an end of the car where they will be accessible to the operator for simultaneous control of the several power gas generators. Expansion joints 53 are provided in the various connections between power gas generators and the manifold 45 and from each generator exhaust to the manifold.

The controls for each gas generator and for the associated turbine are preferably of the type described and claimed in the co-pending application of Frank M. Lewis, Serial No. 599,361, now U. S. Patent No. 2,435,970, dated February 17, 1948, although any other suitable control system may be employed.

The electric generator 43 may be utilized to furnish power to the truck carried motors (not shown) in accordance with conventional locomotive practice or the generator may be coupled to a standard electric locomotive carried as a separate car in the train.

It will be seen that each power gas generator 46 is isolated from the power gas manifold 45 by expansion joints 53 and longitudinal expansion of each generator may be provided as indicated in Fig. 3, by mounting the generator with respect to the car floor by straps 30 which pass around the barrel of the power gas generator at a point adjacent the compressor chambers thereof. The straps 30 cooperate with suitable mounting means 31 fixed to the floor of the locomotive. Power gas generators of the free piston type are inherently free from unbalanced forces which tend to set up vibrational stresses so that mounting straps 30 are sufficient to prevent movement of a power gas generator with respect to the floor of the locomotive. Further, it will be seen that the exhaust connection 49 of each generator represents a substantially fixed point of orientation of the generator laterally of the car. The straps 30 are banded about the generator with sufficient force to prevent slippage, but will still allow the small movement resulting from thermal expansion. Each of the power gas generators is shown only diagrammatically and the details of its construction are not claimed in this application, but reference may be had to my co-pending application, Serial No. 583,334, now U. S. Patent No. 2,406,037 dated August 20, 1946, for a more detailed disclosure of the construction of a suitable free piston power gas generator.

Referring to Figs. 4 to 9 inclusive, there is shown a locomotive carried by pilot trucks 11, trailer trucks 12, and drivers 14. In the form shown in Fig. 4 the drivers are connected together by side rods 15 and the two center pairs are provided with gears 16 meshing with reducing gears 17 driven by a pinion 18. The pinion 18 is connected to the crankshaft of a multicylinder reciprocating engine 19 carried by the main car frame.

The reciprocating engine is preferably a double acting expansible fluid engine so that power gas is supplied above and below the piston at each stroke, and expanded down to cut-off pressure and exhausted through an exhaust manifold. The driving gas is supplied at an elevated temperature and pressure from a plurality of power gas generators 46, the output of all of which is regulated in accordance with the torque requirements of the locomotive. It will be seen that this installation provides a very low center of gravity for the locomotive, increases the flexibility and reliability of operation since the power gas generators are independently removable, and divorces each power gas generator from its neighbor and from the engine so far as thermal stresses are concerned, by expansion joints 53.

If desired the center of gravity of the locomotive may be additionally lowered by mounting the driving engines close to the trucks and below the floor of the locomotive. Such an installation is shown in Figs. 5, 6, and 7. In Fig. 5 the reciprocating engine, designated 55, is in the form of a four-cylinder, double acting unit, the crankshaft 56 of which is connected at each end to driving rods 57. The rods 57 are in turn connected to the driving wheels in a conventional manner. Admission of power gas to the several cylinders is controlled by conventional D slide valves 58 and valve gear 59. The free piston power gas generators are again mounted transversely of the locomotive and are accessible through side ports of the locomotive body.

The low center of gravity may be retained and further subdivision of the driving units may be had by applying a single acting power cylinder to each driving axle as shown in Fig. 6. As indicated, each driving axle of the locomotive is geared to a pinion 60 associated with a crankshaft 61 of a reciprocating engine 62. For economy in connections, and to provide a balanced arrangement, the cylinders of adjacent pairs of engines are fed from a common power gas header 64. A suitable flexible connection 65 in the header permits not only expansion under heat, but flexibility of movement of the engines and trucks with respect to the floor of the locomotive. Additional flexibility may be gained by introducing flexible couplings 67 in the respective engine intakes.

It is, of course, apparent that while a single cylinder engine associated with each axle as shown in Fig. 6 may be used, a multicylinder engine may be substituted therefor. Such an installation is shown in Figs. 7 and 9 and comprises at each driving axle a three-cylinder engine 70 the cylinders of which are horizontally disposed. The pistons are connected to crankshafts which in turn drive pinions 71 and gears 72 mounted on each driving axle of the locomotive. If the three-cylinder engines are made double acting, additional power may be gained for the drivers.

It will be apparent that the present invention provides a very compact and highly powerful locomotive unit in which the availability time is greatly increased since the several power gas generators are independently removable and replaceable elements.

While the invention has been shown in various modified forms it will be appreciated that additional modifications and changes may be made without departing from the spirit of the invention as defined in the appended claims.

Having thus described my invention, what I claim as new and desire to secure by United States Letters Patent is:

1. An elongated vehicle having a power unit mounted therein, said unit comprising an elongated gas generator of the free piston internal combustion engine type having a lateral exhaust midway of its length, a connection for the exhaust holding the engine against longitudinal movement while providing for lateral expansion and contraction of the engine, and means supporting the engine slidably for longitudinal expansion and contraction and holding the engine laterally in predetermined relation to the vehicle.

2. A railway car having a power unit comprising an elongated gas generator of the free piston internal combustion engine type having a lateral exhaust midway of its length, a connection for the exhaust holding the engine against longitudinal movement, and means supporting the engine slidably for longitudinal contraction and expansion while holding the engine in a substantially fixed transverse position with respect to the axis of the car.

3. A railway car having a power unit comprising a gas turbine with its axis longitudinal of the car, a gas generator of the free piston internal combustion engine type with its axis transverse to the car, a connection between the generator exhaust and the turbine inlet, and means mounting the generator to have axial expansion and contraction away from or towards said connection.

4. A railway car having a power unit comprising a gas supply header having inlets spaced longitudinally of the car, a plurality of gas generators of the free piston internal combustion engine type each having its exhaust adjacent said header inlets, a removable and expansible connection between the exhaust and the adjacent inlet, and supports for each generator holding it transversely of the car and permitting expansion and contraction due to changes in temperature, away from and towards said connection.

ROBERT P. RAMSEY.

REFERENCES CITED

The following references are of record in the file of this patent:

UNITED STATES PATENTS

| Number | Name | Date |
| --- | --- | --- |
| 1,655,010 | Buchli | Jan. 3, 1928 |
| 1,701,363 | Herr | Feb. 5, 1929 |
| 1,920,142 | Holzwarth | July 25, 1933 |
| 1,981,618 | Faverty | Nov. 20, 1934 |
| 2,299,420 | Esse | Oct. 20, 1942 |
| 2,306,978 | Pescara | Dec. 29, 1942 |